(12) United States Patent
Russell

(10) Patent No.: US 7,523,459 B2
(45) Date of Patent: Apr. 21, 2009

(54) SYSTEM AND METHOD FOR MANAGING MESSAGES ON A QUEUE

(75) Inventor: Nick Scott Russell, Shawnee, KS (US)

(73) Assignee: Sprint Communications Company LP, Overland Park, KS (US)

( * ) Notice: Subject to any disclaimer, the term of this patent is extended or adjusted under 35 U.S.C. 154(b) by 574 days.

(21) Appl. No.: 10/685,000

(22) Filed: Oct. 14, 2003

(65) Prior Publication Data

US 2005/0080819 A1    Apr. 14, 2005

(51) Int. Cl.
*G06F 13/00* (2006.01)
*G06F 17/30* (2006.01)

(52) U.S. Cl. .................. 719/314; 719/313; 709/204; 709/205; 709/206; 709/207; 707/104.1

(58) Field of Classification Search ............. 719/313, 719/314; 709/204, 205, 206, 207; 707/104.1
See application file for complete search history.

(56) References Cited

U.S. PATENT DOCUMENTS

| | | | | |
|---|---|---|---|---|
| 5,371,850 A * | 12/1994 | Belsan et al. | .............. | 719/314 |
| 5,928,333 A * | 7/1999 | Landfield et al. | ............ | 709/245 |
| 5,983,265 A * | 11/1999 | Martino, II | ............... | 709/206 |
| 6,518,983 B1 * | 2/2003 | Grohmann et al. | ......... | 715/781 |
| 6,529,932 B1 * | 3/2003 | Dadiomov et al. | ......... | 718/101 |
| 6,643,694 B1 * | 11/2003 | Chernin | ..................... | 709/223 |
| 6,817,018 B1 * | 11/2004 | Clarke et al. | ............... | 719/313 |
| 7,127,507 B1 * | 10/2006 | Clark et al. | ................. | 709/224 |
| 7,167,550 B2 * | 1/2007 | Klos et al. | ............. | 379/201.01 |
| 2002/0002677 A1 * | 1/2002 | Eade et al. | .................. | 713/164 |
| 2002/0004835 A1 * | 1/2002 | Yarbrough | .................. | 709/230 |
| 2002/0111986 A1 * | 8/2002 | Wolfson | ..................... | 709/200 |
| 2002/0124116 A1 * | 9/2002 | Yaung | ........................ | 709/313 |
| 2002/0143947 A1 * | 10/2002 | Ishmael et al. | ............. | 709/226 |
| 2003/0093576 A1 * | 5/2003 | Dettinger et al. | ............ | 709/313 |
| 2003/0115366 A1 * | 6/2003 | Robinson | .................... | 709/248 |
| 2003/0126109 A1 * | 7/2003 | Couch et al. | .................. | 707/1 |
| 2003/0135542 A1 * | 7/2003 | Boudreau | .................. | 709/203 |
| 2003/0182464 A1 * | 9/2003 | Hamilton et al. | ............ | 709/314 |
| 2004/0215725 A1 * | 10/2004 | Love et al. | ................... | 709/206 |
| 2004/0260798 A1 * | 12/2004 | Addington et al. | ......... | 709/223 |
| 2006/0053425 A1 * | 3/2006 | Berkman et al. | ............ | 719/313 |
| 2008/0163249 A1 * | 7/2008 | Garza et al. | ................. | 719/314 |

\* cited by examiner

*Primary Examiner*—Charles Rones
*Assistant Examiner*—Phuong-Thao Cao

(57) ABSTRACT

A system for managing messages on a queue is provided comprising a first module operable to read a plurality of messages from the queue and a second module operable to display the plurality of messages from the queue. A method of viewing messaging service messages is also provided. The method comprising selecting a host computer, selecting a queue supported by the messaging service, reading a message from the queue, and displaying a content of the message. Also provided is a method of testing an application which generates messages, comprising running the test application, generating a message by the test application, posting the message to a queue, selecting the queue, and reading the message on the queue to verify whether the test application is operating properly.

22 Claims, 3 Drawing Sheets

SYSTEM AND METHOD FOR MANAGING MESSAGES ON A QUEUE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention is directed to computer software for controlling output and more particularly, but not by way of limitation, to a system and method for viewing a message from a queue.

BACKGROUND OF THE INVENTION

Computer programs or applications may comprise several intercommunicating software modules, components, or processes executing on multiple computer systems. The modules may communicate with each other by sending messages to each other. Some applications employ the Java Messaging Service (JMS) for intercommunication among modules or processes.

JMS provides support for message-based communication between separate Java processes. This message-based communication is asynchronous. More specifically, a message addressed to a recipient or group is sent, and the recipient receives and acts on the message at some later time. Clients of the JMS send and receive messages through a provider that is responsible for delivering messages. In point-to-point JMS, a message is created by one client and addressed to a single remote recipient. The provider is handed the message and delivers it to the one recipient targeted by the message. This model revolves around message queues. A message sender queues outgoing messages for delivery, and a message recipient queues incoming messages for handling. In some cases a JMS server supports the queue, and the message recipient must read from the JMS server's queue. In some circumstances, in a test environment for example, messages may persist and may not be removed from the queue, the queue may become cluttered, and message operations may become inefficient.

SUMMARY OF THE INVENTION

The present embodiment provides a system for managing messages on a queue. The system comprises a first module operable to read a plurality of messages from the queue and a second module operable to display the plurality of messages from the queue.

In one embodiment a method of viewing messaging service messages is provided. The method comprises selecting a host computer, selecting a queue supported by the messaging service, reading a message from the queue, and displaying a content of the message.

In one embodiment a method of testing an application which generates messages is provided. The method comprises running the test application, generating a message by the test application, posting the message to a queue, selecting the queue, and reading the message on the queue to verify whether the test application is operating properly.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present system is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Computer programs or applications may be tested when they are being developed. It may be prudent to test the individual software modules, components, or processes which comprise the application independently before attempting to execute them all together. When a test application component outputs messages, it may be useful to verify that the messages output by the component are correctly structured, that the messages contain correct information in the fields of the message structure, and that the messages are sent to the right destination, for example. It may also be useful to read these messages without removing them from the system or consuming the messages. Reading the messages without diverting them from their normal receiver minimizes the impact on the system under test. The present system is directed to a useful tool and/or utility that is readily adapted to read and manage these messages in the queue on the message server. This is advantageous, for example, during testing since the software which receives the messages may not be mature enough to be employed as a message reader during initial testing of the message sending component.

Figure 1:
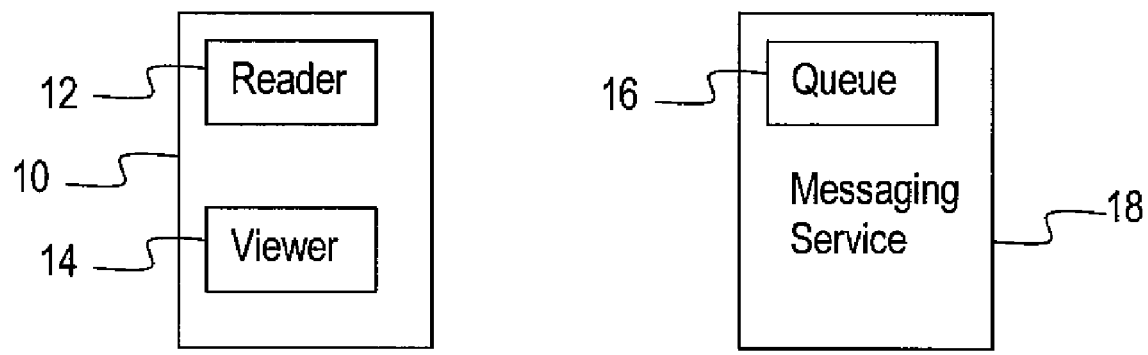
FIG. 1 is a block diagram of a message manager system according to one embodiment.

Turning to FIG. 1 a message manager system 10, constructed according to one embodiment, is depicted. The message manager system 10 comprises a reader module 12 and a viewer module 14. The reader module 12 is operative to read messages from a message queue 16. The message queue 16, in some embodiments, is supported by a messaging service 18. The viewer module 14 is in communication with the reader module 12 and is operable to access the messages read by the reader module 12 and to display the contents of the messages. The message manager system 10 is a software program, application, or component which may execute on a general purpose computer system or may execute in a distributed manner across multiple general purpose computer systems. General purpose computer systems are discussed in more detail hereinafter.

The reader module 12 communicates with the message queue 16 through standard protocols or procedures. The reader module 12 may communicate with the message queue 16 employing socket communication mechanisms, for example. The reader module 12 may communicate with the message queue 16 employing Java Message Service (JMS) procedures. The reader module 12 may employ other standard message communication protocols or procedures for communicating with different queues. Communication between the reader module 12 and the message queue 16 may be indirect and may be mediated by the messaging service 18 which encapsulates the message queue 16.

The messages on the message queue 16 may be sent indirectly to the message queue 16, mediated by the messaging service 18, by other software components, applications, or modules, not shown. The messages are directed to some other software components, modules, or applications, also not shown. These other software components, modules, or applications may indirectly read or retrieve these messages from the message queue 16, mediated by the messaging service 18. The messaging service 18 is a software application, module, or component which executes on a general purpose computer system or may execute in a distributed manner across multiple general purpose computer systems. The messaging service 18 may be provided by a third party software vendor. The messaging service 18 may execute on the same general purpose computer system that the message manager system 10 executes on, or it may execute on a different system.

The structure of the messages may vary considerably among the several embodiments contemplated. The structure of the messages is determined by the sending and the receiving applications. The messages may contain several distinct fields or attributes which organize the information carried in the messages. For example, a JMS message may include a JMStype field that identifies the type of the message, a JMSExpiration field that indicates in milliseconds when the message will expire, a JMSPriority field with a value from 0 to 9 that indicates the urgency of the message, a JMSDeliveryMode field that indicates whether or not the messaging service 18 is expected to persist the message across a server crash, a JMSCorrelationID field that identifies another message with which this message is related, a JMSReplyTo field which indicates where the receiver may send a reply, and a properties field which contains an indefinite number of name/value pairs. These are examples of a message structure, and other message structures are contemplated which may differ from this exemplary message structure and may contain more or fewer fields. Other message structures may employ different names for the fields.

The viewer module 14 communicates with the reader module 12 to access the messages that the reader module 12 has read. This access may take the form of the viewer module 14 sending a request to the reader module 12 to read and return messages or it may be initiated by the reader module 12 reading and sending messages to the viewer module 14. The viewer module 14 is operable to display the content of the messages read from the message queue 16.

Figure 2:
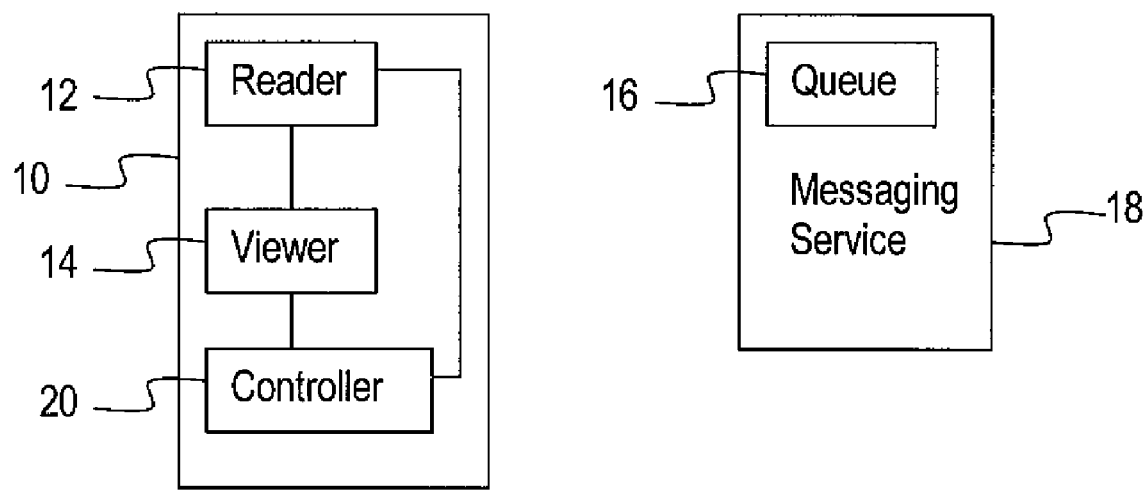
FIG. 2 is a block diagram of a message manager system according to another embodiment.

Turning to FIG. 2, another embodiment of the message manager system 10 is depicted. In this embodiment a controller module 20 is in communication with the reader component 12 and the viewer component 14. The controller module 20 is operable to exercise control over the reader component 12 and the viewer component 14.

The controller module 20 may select different operating modes of the reader module 12. For example, the controller module 20 may select the reader module 14 to read messages destructively from the message queue 16, such as to read from the message queue 16 in a manner that removes the message when the message has been read by the reader module 12, such that the message is no longer stored on the message queue 16. This capability to remove messages from the message queue 16 by reading the messages may be useful when messages accumulate on the message queue 16 and impede system operations. In other circumstances, however, it may be important that the reader module 14 be selected to read messages non-destructively. This may be necessary, for example, when testing a deployed system where messages need to flow out to their normal receivers rather than be diverted to the message manager system 10. The controller module 20 may select different operating modes of the viewer module 14. For example, the controller module 20 may direct the viewer to display an expanded view of a message properties field.

The controller module 20 is further operable to sequence user actions to control the behavior of the viewer module 14. For example, the controller module 20 is adapted to receive user inputs identifying a messaging server host computer where message queue 16 is located. The controller module 20 provides this information to the reader module 12 to establish communication with the message queue 16.

In some embodiments the responsibilities of the controller module 20 are assumed by the reader module 12 and the viewer module 14, thus obviating a separate controller module 20.

Figure 3:
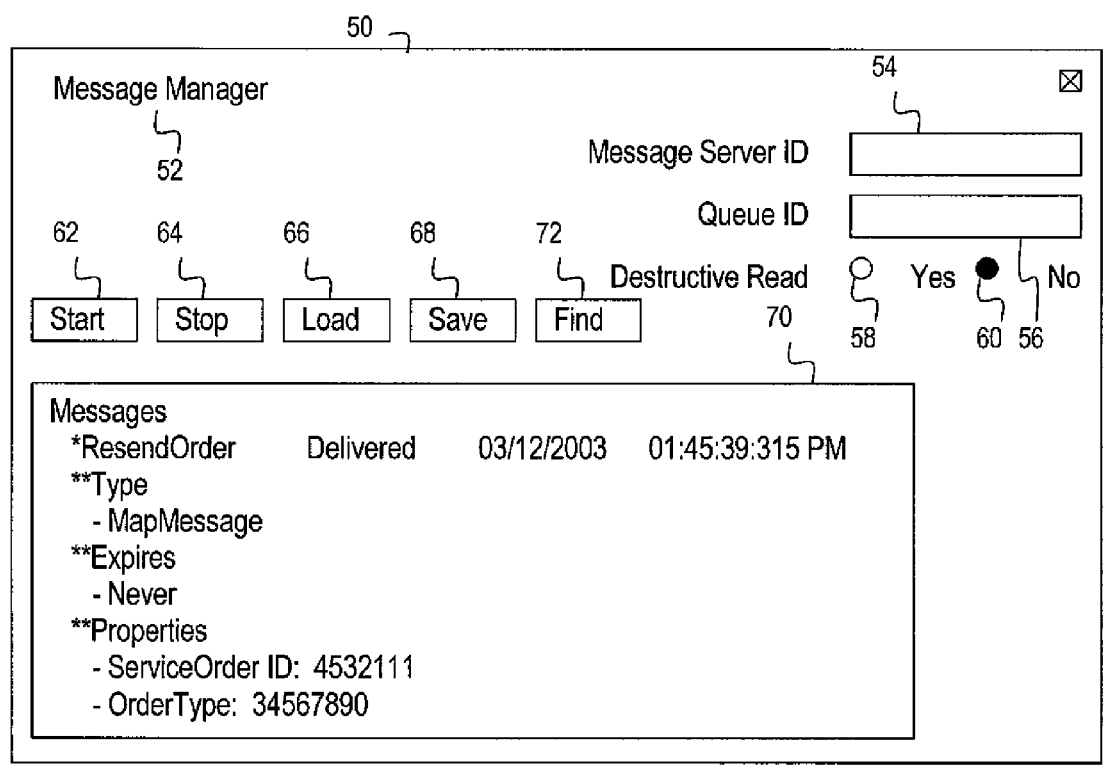
FIG. 3 is an exemplary message manager graphical user interface, in yet another embodiment.

Turning now to FIG. 3, an exemplary message manager window 50 is depicted. The message manager window 50 is a graphical user interface (GUI). In some embodiments the message manager window 50 may have different control buttons and different functions than those depicted in FIG. 3 and described below.

The message manager window title 52 identifies the window as the message manager window. A message server ID input box 54 provides for inputting the location or identity of the message server where messages on the queue 16 are to be managed. A queue ID input box 56 provides for inputting the identity of the message queue 16 whose messages are to be managed. A destructive read Yes select button 58 and a destructive read No select button 60 select whether the reads performed by the reader module 12 delete the message from the queue ("yes" is selected) or leave the message intact on the queue ("no" is selected). The selections are mutually exclusive.

A start button 62 starts the actions of the message manager 10 to display and manage messages. A stop button 64 stops the actions of the message manager 10 to display and manage messages. A window dismiss button 65 dismisses the message manager window 50 and causes the message manager 10 to terminate.

A save button 66 causes the text fill-in fields 54 and 56 and the destructive read select button selections to be saved in memory. A load button 68 causes the last saved input boxes 54 and 56 and the destructive read select button selections to be read from memory and loaded into the input boxes 54 and 56 and the destructive read select button selections to be set. These settings could be saved to a named file, selected from a list of named files, and reloaded.

In one embodiment activating the save button 66 causes a first GUI dialog box to pop-up. The first GUI dialog box provides for inputting the name under which to save the information in the input boxes 54 and 56 and the destructive read select button selections. The first GUI dialog box also provides a save button. When the save button is clicked these settings are saved. In this embodiment, activating the load button 68 causes a second GUI dialog box to pop-up. The second GUI dialog box provides a list of names under which input has been saved. Clicking on one of the names causes the stored settings to load into the input boxes 54 and 56 and the destructive read select button selections.

A message view frame 70 displays the messages read by the reader module 12. The messages are displayed in this embodiment in a hierarchical tree structure. Messages may be displayed as a summary name and date and time stamp. Under the summary name, the attribute names are displayed. Attributes may include message type, message expiration, message priority, message mode, message correlation identify, message reply to, and message properties. Under each attribute name, the attribute value may be displayed. For example, under a message type attribute a value of MapMessage may be displayed. Under the properties attribute, individual name/value pairs are displayed. A name/value pair means the attribute name along with a specific value, for example, "serviceOrderID: 4532111" where the property name is serviceOrderID and the property value is 4532111. The capability of viewing the values of attributes and properties is useful in testing to discriminate messages sent from a software application under test from messages sent by other applications also posting messages through the messaging service 18. The capability of viewing the values of attributes and properties is useful in testing to discriminate among different messages sent by the software application under test.

Double clicking on a properties name/value pair causes a pop-up window to display the full text of the selected properties name/value pair. This feature is useful if the name/value pair is too long to display in a single line of text in the message view frame 70. This feature is also valuable because the tester can see if the entire message is correct or not.

A find button 72 operably displays a message search pop-up window. The message find pop-up window will be discussed in more detail hereinafter.

Figure 4:
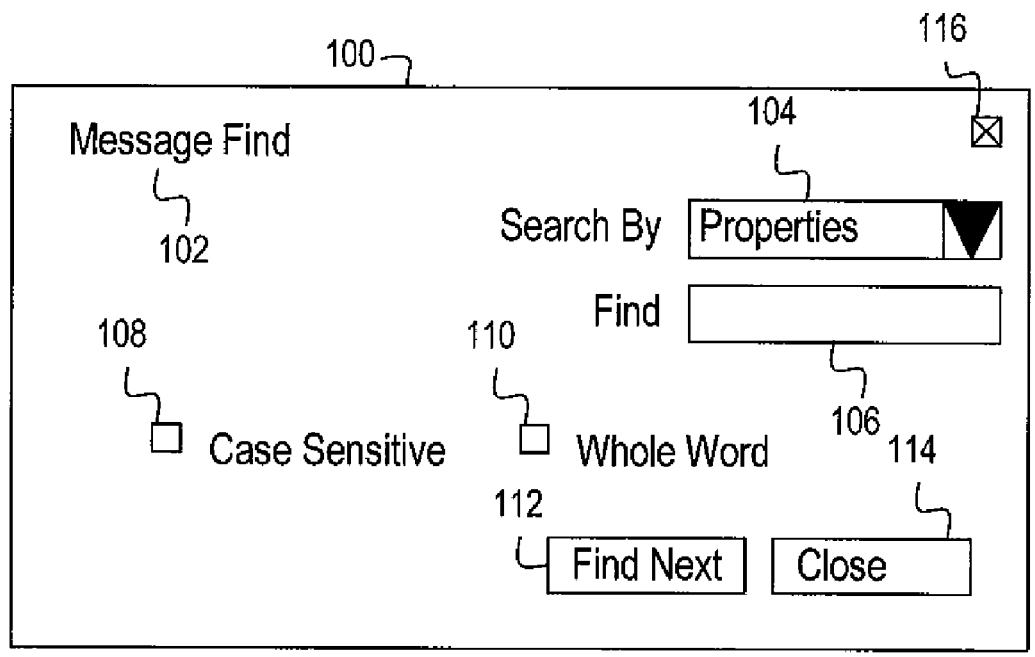
FIG. 4 is an exemplary message searching graphical user interface.

Turning now to FIG. 4 an exemplary message find window 100 is depicted. The message find window 100 is a GUI that allows searching of the messages in the queue 16. In some embodiments the message find window 100 may have additional or different control buttons and functionality than those depicted in FIG. 4.

A title 102 identifies the window as the message find window. A search by input box 104 provides for inputting the search mode. Clicking on the down arrowhead at the right end of the box causes a list of valid search modes to be listed. Search modes may include properties, message type, message expiration, message priority, message mode, message correlation identity, message reply to, etc. These modes are employed to search for messages that share a common property or attribute value. For example, a tester may select a message priority mode to search for all high priority messages. A find input box 106 provides for inputting the search pattern which may include wildcard characters. A case sensitive check-box 108 provides for selecting a case sensitive search. A whole word check-box 110 provides for selecting a whole word search. A find next button 112 provides for starting the search. A close button 114 provides for closing the message find window 100. An exit button 116 also provides for closing the message find window 100.

The search pattern input in the find input box 106 may specify multiple keywords to search for. A match exists if any of multiple keywords specified is found in a message. A search pattern may involve special characters, known as wildcard characters, which may designate that any character may be substituted in the place of a single character wildcard character or which may designate that any number of any characters may be substituted in the place of a multicharacter wildcard character. For example, if the single character wildcard character is the percent sign character, the text pattern '%ox' would be matched by the words 'box' and 'fox.' Again, for example, if the multicharacter wildcard character is the ampersand character, the text pattern 'fire&' would be matched by the words 'fire', 'fireplace', 'firewood', 'fireman', 'firemen', etc.

A search pattern may employ anchor characters to anchor the search pattern to either the start or the end of the text line being analyzed for a match. As an example, if the dollar sign ('$') is used to anchor to the beginning of the text line, the search pattern '$run would be matched by the text line "Run spot, run!" but would not be matched by the text line "Walk don't run."

If the whole word search mode is selected the search pattern must be matched by a text line wherein the search pattern occurs set off from surrounding text as a separate word. For example, the search pattern 'fire' does not find a whole word search mode match in the word 'fireplace.' If a case sensitive search mode is selected the search pattern must match not only character by character but also match upper case to upper case and lower case to lowercase. For example, the text pattern 'Java' does not find a case sensitive match in the words 'java' or 'JAVA.' If the case sensitive search mode is not selected, the text pattern 'Java' is matched by both 'java' and 'JAVA.'

The message find capability allows for searching of message titles, elements of message contents, entire message content among messages on the queue 16. This capability provides the tester powerful tools for selecting from all messages on the queue 16. The search capability provides several ways to reduce the volume of messages that the tester needs to analyze to find relevant messages.

In one embodiment, the display and control components of the message manager window 50 and message find window 100 may be implemented with reusable GUI component technology. The Java Swing package, for example, includes components JTextField, JRadioButton, JButton, JTree, JCheckBox, and JComboBox which may be employed to implement the aspects of the message manager window 50 and message search window 100. Other programming techniques and GUI technologies also may be employed.

The message manager window 50 and message find window 100 GUIs described are exemplary. Different embodiments of the present disclosure may have GUIs that vary in several aspects from the message manager window 50 and the message find window 100 GUIs depicted in FIG. 3 and FIG. 4 and described above.

In some embodiments, the control and display functions of the message manager window 50 may be provided through a command line interface. For example, the message content displayed in the message view frame 70 may be displayed in a textual outline form where the initial control inputs are provided as arguments to a command. In other embodiments the command to start the message manager 10 may activate a query-response sequence to step a user through the process of supplying inputs to initialize the message manager 10. In some embodiments there may be both GUI supported controls and command line or function key supported controls.

Figure 5:
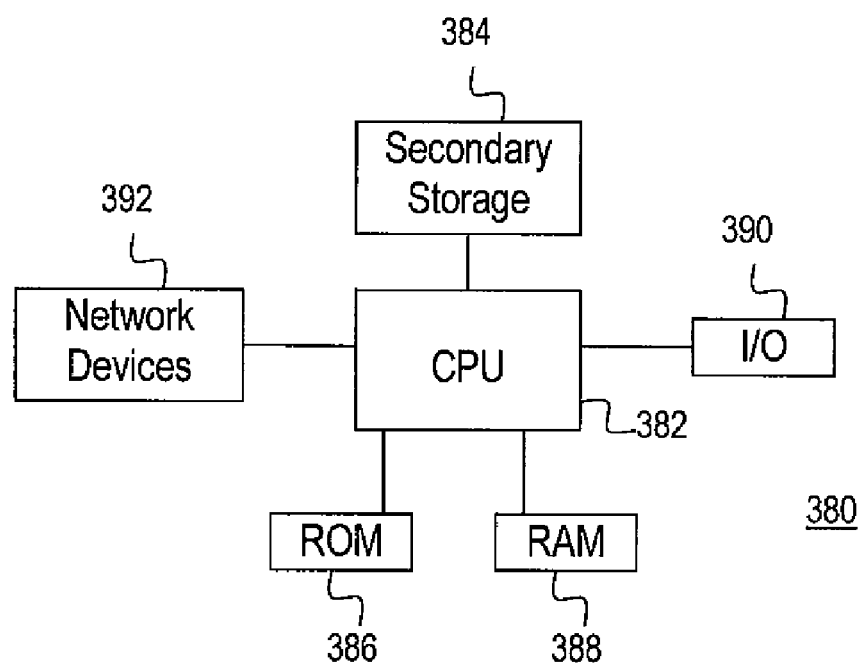
FIG. 5 illustrates an exemplary general purpose computer system suitable for implementing the several embodiments of the message manager system.

The message manager system 10 described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 380 includes a processor 382, which may be referred to as a central processor unit or CPU, that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, keyboards, mice, track balls, voice recognizers, card readers, paper tape readers, or other well-known input devices. The network connectivity devices 392 may take the form of modems, modem banks, ethernet cards, token ring cards, fiber distributed data interface (FDDI) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

The embodiments of the message manager system 10 provide a useful, and reusable testing tool. Whereas in some environments the tester may only be able to determine that messages have been received by the queue 16 of the messaging service 18 but not what application sent the messages or what the content of the messages is, the message manager system 10 can display the content of the messages and thereby identify what application sent the messages and when the messages were sent.

The message manager system 10 allows the tester to view messages without consuming the messages or removing them from the queue 16. This means the message manager system 10 does not alter the software system it is monitoring, it is nonintrusive. This may be a necessary property when probing or analyzing messages on a queue 16 in a deployed functioning system where the testing activity cannot be permitted to interrupt business operations by taking the system off line for testing.

Additionally, the message find capability provides a powerful tool for the tester to reduce the volume of messages they need to comb through to find the messages they need to analyze. The message find capability provides several different searching approaches so that the tester can use the tool in the way which best suits their needs rather than having to accommodate themselves to a single search mechanism.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

I claim:

1. A computer-implemented system to manage messages on a queue, comprising:
   one or more first test systems that send a plurality of messages directed to one or more second systems;
   a messaging service system to direct the plurality of messages to the one or more second systems through the queue, wherein a portion of the one or more second systems cannot read ones of the plurality of messages from the queue that are directed to the portion of the one or more second systems; and
   a computer system to execute a first module and a second module;
   wherein the first module reads the plurality of messages from the queue, wherein the plurality of messages are not directed to the first module and the first module is not a normal receiver of the plurality of messages, wherein the first module is selectable in a mutually exclusive manner between destructively reading the messages from the queue and non-destructively reading the messages from the queue; and
   wherein the second module displays the plurality of messages read from the queue.

2. The computer-implemented system of claim 1, wherein the queue is supported by a java messaging service.

3. The computer-implemented system of claim 2 wherein the queue is on a java messaging service message server.

4. The computer-implemented system of claim 1, wherein the computer system further executes a control module configured to perform the selection of the first module to remove at least one of the plurality of messages read from the queue.

5. The computer-implemented system of claim 1, wherein the computer system further-executes a control module configured to perform the selection of the first module to remove each of the plurality of messages read from the queue.

6. The computer-implemented system of claim 1, wherein each of the plurality of messages includes attributes and wherein the second module is further configured to display the attributes of each of the plurality of messages.

7. The computer-implemented system of claim 1, wherein the plurality of messages each includes attributes and wherein the second module is further configured to display sectional identifiers in the hierarchical tree structure related to the attributes of each one of the plurality of messages.

8. The computer-implemented system of claim 7, wherein each of the attributes is displayed, by the second module, adjacent the sectional identifier associated with the attribute.

9. The computer-implemented system of claim 6, wherein the plurality of attributes of the plurality of messages includes a type attribute, an expires attribute, a priority attribute, a mode attribute, a correlation identification attribute, a reply attribute and a properties attribute, and wherein the second module is further configured to display a type section wherein the type attribute is displayed, an expires section wherein the expires attribute is displayed, a priority section wherein the priority attribute is displayed, a mode section wherein the mode attribute is displayed, a correlation identification section wherein the correlation identification attribute is displayed, a reply section wherein the reply attribute is displayed, and a properties section wherein the properties attribute is displayed.

10. The computer-implemented system of claim 1, wherein each of the plurality of message includes a properties attribute and wherein the second module is configured to display only a portion of the properties attribute.

11. The computer-implemented system of claim 10, wherein the second module is further configured, in response to selecting the displayed portion of the properties attribute, to display in a viewer the complete properties attribute for viewing.

12. The computer-implemented system of claim 1, wherein the second module is further configured to display an identifier associated with the each of the message and a delivery time related to the time the message was delivered to the messaging service.

13. A computer-implemented method of viewing messages on a messaging service, comprising:
    selecting a host computer implementing the messaging service by inputting a host computer identification;
    selecting a queue supported by the messaging service by inputting a queue identification;
    reading a message originating from a first test application and directed to a second application from the queue by a third application, wherein the message is not directed to the third application and the third application is not a normal receiver of the message, and wherein the second application cannot read the message that is directed to the second application;
    storing the read message in a memory;
    displaying full contents of the message using the third application; and
    verifying that the message has a correct message structure, that information in fields of the message structure contain correct information, and that a destination of the message is correct by reviewing the full contents of the message displayed by the third application.

14. The computer-implemented method of claim 13, wherein the message includes a plurality of attributes.

15. The computer-implemented method of claim 14, wherein the queue is on a java messaging service message server.

16. The computer-implemented method of claim 13, further comprising:
    selecting a profile of the host computer having the host computer identification to connect to the host computer, the profile further having the queue identification;
    logging on to the host computer using the profile; and
    connecting to the queue using the profile.

17. The computer-implemented method of claim 16, further comprising:
    selecting a consume control determining whether to consume the messages after the message is read; and
    consuming the message when the consume control has been selected to consume the message.

18. The computer-implemented method of claim 17, further comprising:
    displaying attribute headings including indicia identifying attributes of the message;
    displaying each of the attributes of the message adjacent one of the associated attribute headings.

19. The computer-implemented method of claim 18, further comprising:
    displaying a portion of a properties attribute of the message;
    selecting the properties attribute; and
    displaying the properties attribute in a viewer configured to view an entire text of the properties attribute of the message.

20. The computer-implemented method of claim 18, further comprising:
    searching the messages read from the queue for a string of text; and
    identifying the message having text matching the string of text.

21. A computer-implemented method of testing a test application which generates messaging service messages, comprising:
    running the test application;
    generating a message by the test application directed to a second application;
    posting the message to a queue;
    inputting an identification of a host computer system maintaining the queue using a third application;
    inputting an identification of the queue using the third application;
    destructively reading the message from the queue with the third application, wherein the message is not directed to the third application and the third application is not a normal receiver of the message, and wherein the second application cannot read the message that is directed to the second application;
    storing the read message in a memory;
    displaying the read message using the third application; and
    verifying that the read message has a correct message structure, that fields of the message structure contain correct information, and that a destination of the message is correct.

22. The computer-implemented method of claim 21, wherein one of the fields of the message structure is an attribute field, and wherein displaying the read message includes displaying attributes of the attribute field, and wherein the queue is supported by a Java messaging service.

* * * * *